(12) United States Patent
Chen et al.

(10) Patent No.: US 9,770,868 B2
(45) Date of Patent: Sep. 26, 2017

(54) THREE-DIMENSIONAL PRINTING MODULE AND THREE-DIMENSIONAL PRINTING APPARATUS USING THE SAME

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Wen-Ten Lin, New Taipei (TW); Ming-Hsiung Ding, New Taipei (TW)

(73) Assignees: XYZprinting, Inc., New Taipei (TW); Kinpo Electronics, Inc., New Taipei (TW); Cal-Comp Electronics & Communication Company Limited, New Taipei (TW)

( * ) Notice: Subject to any disclaimer, the term of this patent is extended or adjusted under 35 U.S.C. 154(b) by 622 days.

(21) Appl. No.: 14/284,398

(22) Filed: May 22, 2014

(65) Prior Publication Data

US 2015/0290879 A1 Oct. 15, 2015

(30) Foreign Application Priority Data

Apr. 15, 2014 (TW) .............................. 103113682 A

(51) Int. Cl.
*B29C 67/00* (2017.01)
*B33Y 10/00* (2015.01)
*B29K 105/00* (2006.01)
*B33Y 30/00* (2015.01)

(52) U.S. Cl.
CPC ...... *B29C 67/0085* (2013.01); *B29C 67/0066* (2013.01); *B33Y 10/00* (2014.12); *B29K 2105/0058* (2013.01); *B33Y 30/00* (2014.12)

(58) Field of Classification Search
None
See application file for complete search history.

(56) References Cited

U.S. PATENT DOCUMENTS

| 5,450,806 | A | * | 9/1995 | Jean | ........................ | B63B 25/16 |
| | | | | | | 114/74 A |
| 2010/0247703 | A1 | * | 9/2010 | Shi | ...................... | B29C 67/0081 |
| | | | | | | 425/375 |
| 2014/0085620 | A1 | | 3/2014 | Lobovsky et al. | | |

FOREIGN PATENT DOCUMENTS

| CN | 202764224 U | 3/2013 |
| CN | 203317755 U | 12/2013 |
| JP | 3-55225 A | 3/1991 |
| TW | 498834 | 8/2002 |
| WO | 2012106256 A1 | 8/2012 |

OTHER PUBLICATIONS

"Office Action of Taiwan Counterpart Application", dated Jul. 12, 2016, p. 1-p. 3.

* cited by examiner

*Primary Examiner* — Jacob Thomas Minskey
(74) *Attorney, Agent, or Firm* — Jianq Chyun IP Office

(57) ABSTRACT

A three-dimensional (3D) printing module including a tank filled with a liquid forming material, a top cover assembled on the tank to close the tank, a modeling platform assembled to the cover, and a first tenon movably disposed in the cover is provided. The modeling platform is immersed in the liquid forming material in the tank. When the first tenon is driven along a second axis, the cover and the modeling platform are driven along a first axis to open the tank. A 3D printing apparatus is also provided.

19 Claims, 3 Drawing Sheets

THREE-DIMENSIONAL PRINTING MODULE AND THREE-DIMENSIONAL PRINTING APPARATUS USING THE SAME

CROSS-REFERENCE TO RELATED APPLICATION

This application claims the priority benefit of Taiwan application serial no. 103113682, filed on Apr. 15, 2014. The entirety of the above-mentioned patent application is hereby incorporated by reference herein and made a part of this specification.

BACKGROUND

Technical Field

The disclosure relates to a three-dimensional (3D) printing module, and particularly relates to a detachable 3D printing module configured on a 3D printing apparatus.

Related Art

Along with progress of computer-aided manufacturing (CAM), manufacturing industry has developed a three-dimensional (3D) printing technology, by which an original design conception can be quickly manufactured. The 3D printing technology is actually a general designation of a series of rapid prototyping (RP) techniques, and a basic principle thereof is additive manufacturing, where a RP machine is used to form sectional shapes of a workpiece in an X-Y plane through scanning, and intermittently shift by a layer thickness along a Z-axis, so as to form a 3D object. The 3D printing technology is not limited to any geometric shape, and the more complex the workpiece is, the more excellence of the RP technology is demonstrated. The 3D printing technology can greatly save manpower and a processing time, and under a demand of the shortest time, a digital 3D model designed by software of 3D computer-aided design (CAD) can be truly presented as a physical part, which is not only touchable, a user can also actually feel a geometric curve of the physical part, and test assemblability of the physical part or even perform possible functional tests.

Methods of forming a plurality of thin cross-sectional layers have been developed. For example, a printing head generally moves along X-Y coordinates above a base according to X-Y-Z coordinates constructed according to design data of a 3D model, and sprays a constructing material to form a correct cross-sectional layer shape. The deposited material can be naturally solidified or cured under a strong light source to form the required cross-sectional layers, and a 3D object is formed as the deposited material is cured layer-by-layer.

The user is required to replace a liquid forming material and clean a tank and related components each time after the 3D printing is completed, so as to prevent residuals of the previous liquid forming material from influencing a next operation. However, the above cleaning operation causes a certain burden to the user, i.e. in view of usage, the above cleaning operation cannot provide the user a clean, convenient and efficient fabrication process. Therefore, how to integrated and modularize related consumptive materials and components in the 3D printing process to improve cleanliness of the fabrication process and user's convenience is an important issue required to be considered by related practitioners.

SUMMARY

The disclosure is directed to a three-dimensional (3D) printing module and a 3D printing apparatus using the same, and based on a detachable characteristic of the 3D printing module, usage convenience of the 3D printing apparatus is improved.

The disclosure provides a 3D printing module including a tank, a top cover, a modeling platform, a first tenon. The tank is configured to contain a liquid forming material. The top cover is detachably assembled to the tank to open or close the tank. The modeling platform is assembled to the top cover and is located in the tank and immersed in the liquid forming material. The first tenon is movably assembled to the top cover. When the first tenon actuates along a second axis, the top cover and the modeling platform actuate along a first axis to open the tank.

The disclosure provides a 3D printing apparatus including a base, a driving mechanism disposed on the base and a 3D printing module. The 3D printing module is detachably assembled to the base, and a part of the driving mechanism is movably located above the 3D printing module. The 3D printing module includes a tank, a top cover, and a first tenon. The tank is configured to contain a liquid forming material. The top cover is detachably assembled to the tank to open or close the tank. The first tenon is movably assembled to the top cover. The first tenon is locked to the tank to close the top cover and fix the top cover to the tank. When the driving mechanism and the top cover are assembled, the driving mechanism drives the first tenon to be unlocked from the tank, such that the top cover moves away from the tank along with the driving mechanism to open the tank.

According to the above descriptions, in an embodiment of the disclosure, the first tenon has a driving portion and a first locking portion extending from the driving portion. The driving portion is movably disposed in a protrusion portion, and a part of the driving portion protrudes out of the protrusion portion. A part of the first locking portion protrudes out of a side edge of the cover body and is correspondingly locked to a locking hole of the tank. When the driving mechanism and the top cover are assembled, the driving mechanism pushes the part of the driving portion that protrudes out of the protrusion portion into the protrusion portion, so as to drive the first locking portion to be unlocked from the locking hole.

According to the above descriptions, in an embodiment of the disclosure, by using the first tenon assembled to the top cover, when the 3D printing module is not used, the top cover and the tank maintain a close state. When the 3D printing is performed, by assembling the driving mechanism to the top cover of the 3D printing module, the first tenon in the top cover is pushed to retrieve from the tank, so that during the 3D printing process, the top cover gradually moves away from the tank along with the driving mechanism. In this way, by modularizing the consumables and the aforementioned components, the 3D printing module is regarded as a consumable module in the 3D printing process, i.e. the user is able to immediately re-execute the 3D printing by replacing the 3D printing module, and it is unnecessary to deal with or clean the tank or the liquid modelling material remained during the previous 3D printing process, and cleanliness of the fabrication process and usage convenience are effectively enhanced.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated

DETAILED DESCRIPTION OF DISCLOSED EMBODIMENTS

Figure 1:
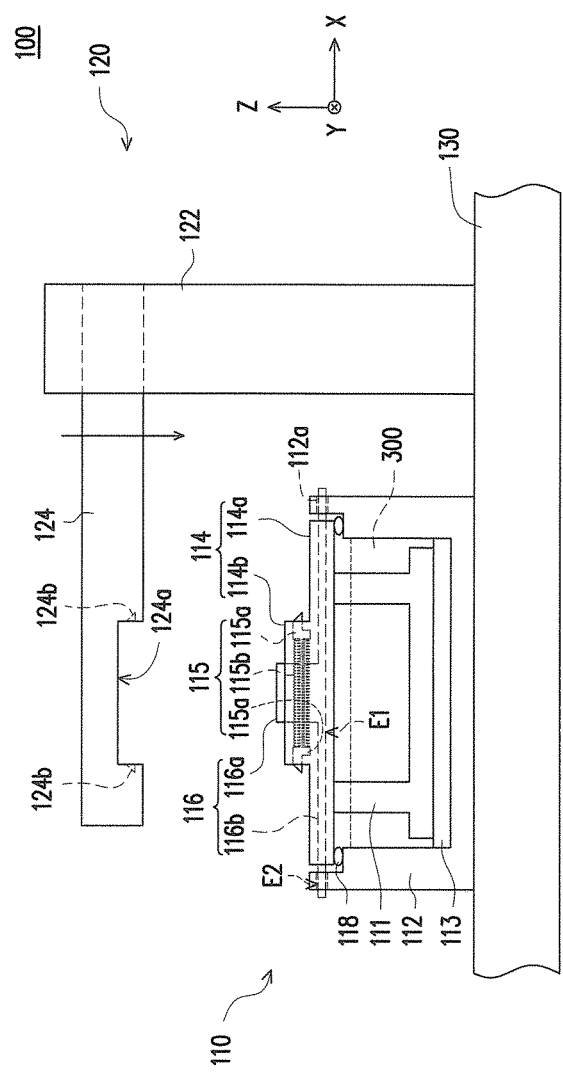
FIG. 1 is a schematic diagram of a three-dimensional (3D) printing apparatus according to an embodiment of the disclosure.
Figure 2:
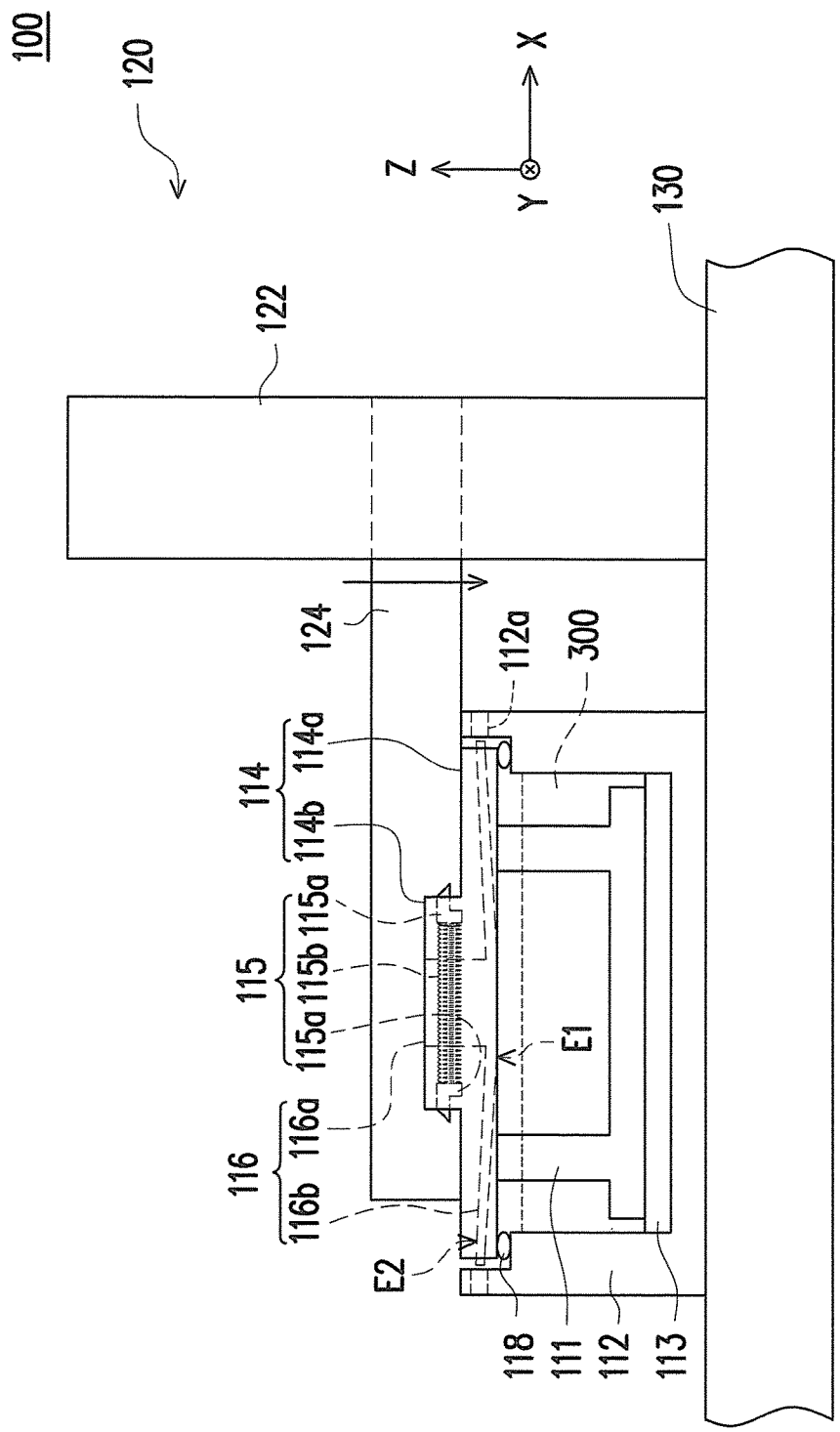
FIG. 2 and FIG. 3 are usage schematic diagrams of the 3D printing apparatus of FIG. 1.
Figure 3:
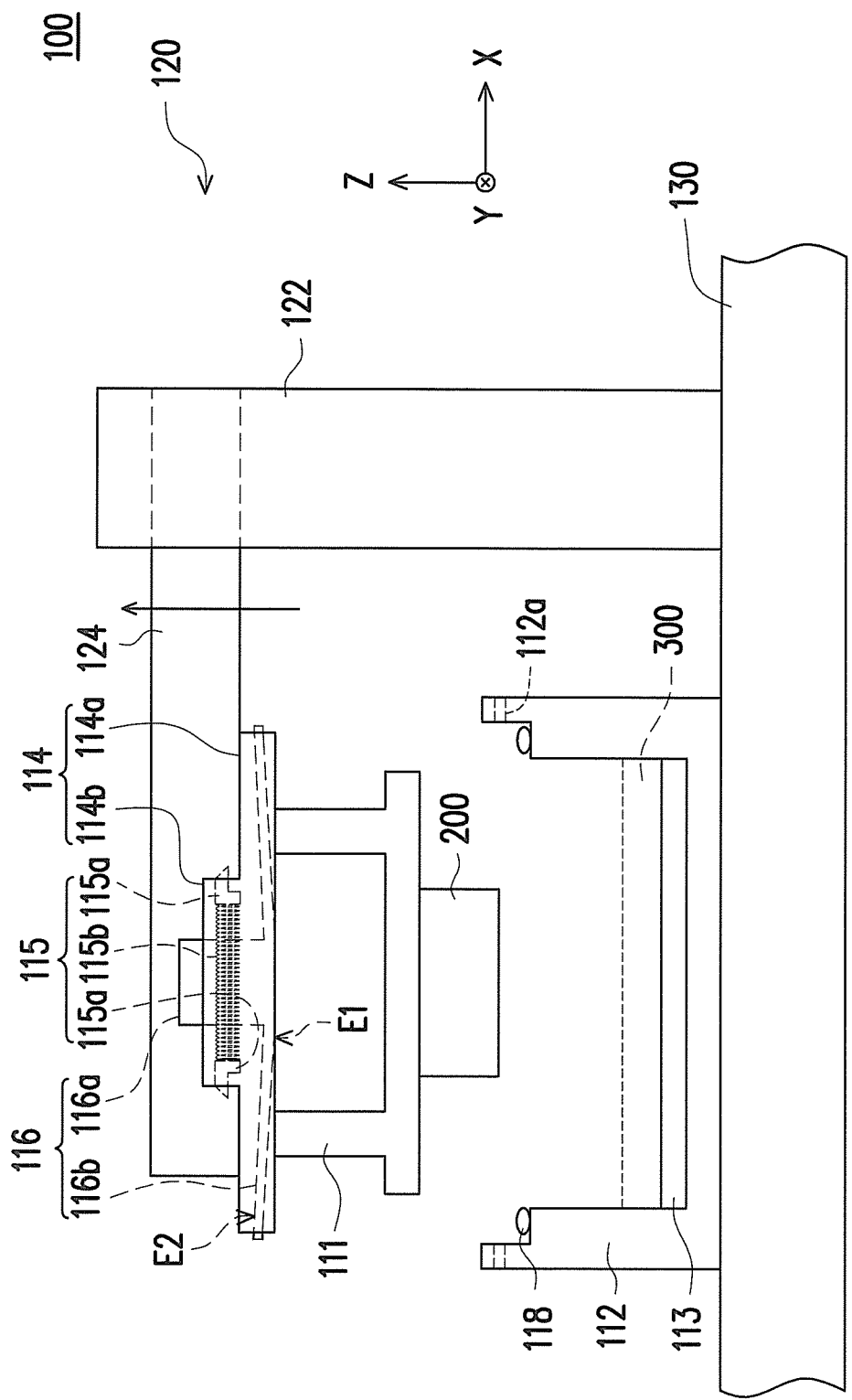

FIG. 1 is a schematic diagram of a three-dimensional (3D) printing apparatus according to an embodiment of the disclosure. FIG. 2 and FIG. 3 are usage schematic diagrams of the 3D printing apparatus of FIG. 1. Meanwhile, a Cartesian coordinate system is provided in the figures to facilitate describing a corresponding relationship of the related components. Referring to FIG. 1 to FIG. 3, in the present embodiment, the 3D printing apparatus 100 is, for example, a stereo lithography appearance (SLA) 3D printing apparatus, which includes a 3D printing module 110, a driving mechanism 120 and a base 130. The 3D printing module 110 is detachably assembled to the base 130, the driving mechanism 120 is disposed on the base 130, and a part of the driving mechanism 120 is movably located above the 3D printing module 110.

The 3D printing module 110 includes a tank 112, a top cover 114, and a first tenon 116 and a modeling platform 111. The modeling platform 111 is assembled to the top cover 114, the tank 112 is configured to contain a liquid forming material 300, which is, for example, photosensitive resin. The top cover 114 is detachably assembled to the tank 112 to open or close the tank 112. The first tenon 116 is movably assembled to the top cover 114, and the first tenon 116 is locked (or buckled) to the tank 112 to fix the top cover 114 to an opening of the tank 112 to close the tank 112. When the top cover 114 and the tank 112 are assembled through the first tenon 116, the modeling platform 111 is substantially located in the tank 112 and immersed in the liquid forming material 300. Moreover, the 3D printing module 110 further includes a sealing part 118, which is disposed at the opening of the tank 112 and leans between the top cover 114 and the tank 112 to seal the opening of the tank 112. The sealing part 118 is used for sealing the liquid forming material 300 in the tank 112 to prevent leakage of the liquid forming material 300 through a gap between the tank 112 and the top cover 114 due to movement. In this way, the 3D printing module 110 can be assembled to the base 130 or disassembled from the base 130 according to user's requirement.

Moreover, the 3D printing module 110 further includes a separation film 113, which is disposed at a bottom of the tank 112, and when the 3D printing module 110 is not used, the separation film 113 contacts between the modeling platform 111 and the bottom of the tank 112. In the present embodiment, the separation film 113 is used for preventing a 3D object 200 from sticking to the bottom of the tank 112 during a forming process.

On the other hand, the 3D printing apparatus 100 further includes a light source (not shown), which is, for example, an ultraviolet light source and is disposed in the base 130. During the 3D printing process, after the user assembles the required 3D printing module 110 to the base 130, the driving mechanism 120 is controlled by a control unit (not shown) to move close to the top cover 114 of the 3D printing module 110 and is assembled to the top cover 114 to release a locking relationship between the first tenon 116 and the tank 112. Then, the light source provides a curing light to irradiate the liquid forming material 300 from the bottom of the tank 112, and as the driving mechanism 120 drives the top cover 114 and the modeling platform 111 thereon to gradually move away from the tank 112, the aforementioned light can cure the liquid forming material 300 on the modeling platform 111 layer-by-layer according to a required contour, and finally form the 3D object 200 on the modeling platform 111, and the 3D object 200 can be taken away from the tank 112 by the driving mechanism 120 along with the modeling platform 111 and the top cover 114, and then the 3D object 200 is disassembled from the modeling platform 111 to complete the 3D printing operation. More importantly, the user can immediately perform the 3D printing operation with replaced liquid forming material by only replacing the required 3D printing module.

According to the above descriptions, by modularizing the tank 112, the top cover 114 and the modeling platform 111 and the liquid forming material 300 in the tank 112, the 3D printing module 110 can be used as a consumable module of the 3D printing process, i.e. the user can select the proper 3D printing module 110 according to an actual requirement, and replace the corresponding 3D printing module 110 according to requirement of each 3D printing process. Moreover, by using the first tenon 116 disposed in the top cover 114, the 3D printing module 110 can be disassembled, such that the user is unnecessary to worry about cleaning the remained liquid forming material 300 and the related components after the 3D printing process. In other words, based on replaceability of the 3D printing module 110, the 3D printing efficiency is improved, and the user can implement the 3D printing task through a convenient and clean usage environment, so as to indirectly improve user's preference level of the 3D printing apparatus 100.

In detail, referring to FIG. 1 and FIG. 2, in the present embodiment, the driving mechanism 120 includes a driving platform 122 (which is a lifting platform capable of moving along a Z-axis as shown in FIG. 1, though the disclosure is not limited thereto) disposed on the base 130 and a connection arm 124 movably disposed on the driving platform 122. When the 3D printing module 110 is assembled to the base 130, the driving platform 122 is located beside the 3D printing module 110, and the connection arm 124 looks like a cantilever relative to the driving platform 122, and the connection arm 124 movable along the Z-axis is located above the 3D printing module 110.

Moreover, the top cover 114 of the 3D printing module 110 includes a cover body 114a and protrusion portion 114b located on the cover body 114a, where a contour of the protrusion portion 114b corresponds to a recess 124a (shown in FIG. 1) of the connection arm 124, and a partial contour of the connection arm 124 facing the top cover 114 is matched to a partial contour of the protrusion portion 114b and the cover body 114a, so as to improve structural integrity of the top cover 114 and the connection arm 124 combined to each other.

Moreover, the 3D printing module 110 further includes a second tenon 115, which is movably assembled to the protrusion portion 114b of the top cover 114, and can move in or move out of a sidewall of the protrusion portion 114b along an X-axis. Correspondingly, the connection arm 124 has the recess 124a and the second locking portions 124b on the sidewall of the recess 124a, where the second locking portions 124b are, for example, mortises, so that when the connection arm 124 is assembled to the top cover 114, the protrusion portion 114b is correspondingly accommodated in the recess 124a, and the second tenon 115 is correspondingly locked to the second locking portion 124b.

As shown in FIG. 1 to FIG. 3, the second tenon 115 includes a pair of wedge-shaped locking members 115a disposed along the X-axis and an elastic member 115b connected between the pair of wedge-shaped locking members 115a, where the elastic member 115b constantly drives the pair of wedge-shaped locking members 115a to protrude out of the sidewall of the protrusion portion 114b along the X-axis. In this way, when the recess 124a of the connection arm 124 is fit to the protrusion portion 114b of the top cover 114, the sidewall of the recess 124a can push the wedge-shaped locking members 115a along a wedge surface of each wedge-shaped locking member 115a to compress the elastic member 115b. Once the protrusion portion 114b is completely accommodated in the recess 124a, based on an elastic restoring force of the elastic member 115b, the wedge-shaped locking members 115a stretch out of the sidewall of the protrusion portion 114b and are locked to the second locking portions 124b to complete assembling the top cover 114 and the connection arm 124. When the user wants to conduct the 3D printing, the user can move the connection arm 124 of the driving mechanism 120 downwards along the Z-axis for assembling the same with the top cover 114 as that described above.

Referring to FIG. 2 and FIG. 3, while the connection arm 124 is assembled with the top cover 114, the connection arm 124 can also push and drive the first tenon 116 to be unlocked from the tank 112 through the structure of the recess 124a. In detail, the first tenon 116 has a driving portion 116a and a pair of first locking portions 116b extending from the driving portion 116a, where the driving portion 116a is movably disposed in the protrusion portion 114b of the top cover 114 along the Z-axis, and when the 3D printing module 110 is not used, a part of the driving portion 116a protrudes out of the protrusion portion 114b. Moreover, a part of the first locking portion 116b protrudes out of a side edge of the cover body 114a and is correspondingly locked to a locking hole 112a of the tank 112. When the driving mechanism 120 is assembled with the top cover 114 through the connection arm 124, the connection arm 124 pushes the part of the driving portion 116a that protrudes out of the protrusion portion 114b into the protrusion portion 114b, so as to drive the first locking portion 116b to be unlocked from the locking hole 112a Further, the first tenon 116 of the present embodiment is, for example, made of rubber and is flexible, i.e. when the driving portion 116a is pushed by the connection arm 124 to move downwards along the Z-axis (i.e. move along a negative Z-axis direction), a first end E1 of the first locking portion 116b connected to the driving portion 116a moves along the negative Z-axis direction (i.e. the first locking portion 116b is deformed relative to the driving portion 116a), so as to drive a second end E2 of the first locking portion 116b to retrieve from the locking hole 112a of the tank 112 and accordingly release the first locking portion 116b from the locking hole 112a. In this way, when the connection arm 124 and the protrusion portion 114b of the top cover 114 are combined through the second tenon 115, the first tenon 116 is driven to be released from the tank 112, so that the top cover 114 is driven by the driving mechanism 120 to move along a positive Z-axis direction to move away from the tank 112.

In the present embodiment, the first tenon 116 is composed of a driving portion 116a and a pair of first locking portions 116b, where if the position where the driving portion 116a is located is taken as an axis, the pair of first locking portions 116b radially extend away from each other from the driving portion 116a. However, the number of the first locking portions 116b is not limited by the disclosure. Moreover, in another embodiment that is not illustrated, the driving portion and the first locking portions of the first tenon can be a linking-up mechanism, i.e. the first locking portions are connected to the driving portion in a non-fixing manner. For example, the first locking portions are pivotally connected to the driving portion, and in collaboration with a moving track within the cover body, when the driving portion is pushed along the Z-axis, the first locking portions can also be moved along the X-axis to withdraw from the locking holes (i.e. as that shown in the aforementioned embodiment, a moving axial direction of the driving portion 116a is perpendicular to a moving axial direction of the first locking portions 116b retrieved from the locking holes 112a). In other words, when the first tenon 116 actuates along a second axis (the X-axis), the top cover 114 and the modeling platform 111 can actuate along a first axis (the Z-axis) to open the tank 112, where the first axis is perpendicular to the second axis.

In summary, in the embodiment of the disclosure, by using the first tenon assembled to the top cover, when the 3D printing module is not used, the top cover and the tank maintain a close state. When the 3D printing is performed, by assembling the driving mechanism to the top cover of the 3D printing module, the first tenon in the top cover is pushed to retrieve from the tank. Meanwhile, the top cover can be combined to the connection arm of the driving mechanism through the second tenon, so as to start the 3D printing operation. Therefore, during the 3D printing process, the top cover gradually moves away from the tank along with the driving mechanism, i.e. through the coherent combination and release operations between the top cover, the tank and the driving mechanism, the 3D printing apparatus can immediately start the 3D printing operation without dealing with the related component or the consumables remained during the previous 3D printing process. In other words, by modularizing the consumables and the aforementioned components, the 3D printing module is regarded as a consumable module in the 3D printing process, i.e. the user is able to immediately re-execute the 3D printing by replacing the 3D printing module, by which cleanliness of the fabrication process and usage convenience are effectively enhanced.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional printing module adapted to be detachably assembled to a three-dimensional printing apparatus, comprising:
   a tank, configured to contain a liquid forming material;
   a top cover, detachably assembled to the tank to close the tank;
   a modeling platform, assembled to the top cover, located in the tank, and immersed in the liquid forming material; and
   a first tenon, movably assembled to the top cover, the top cover locked to or released from the tank through the first tenon, wherein when the top cover is locked to the tank through the first tenon, the three-dimensional printing module can be dissembled from the three-dimensional printing apparatus, wherein when the first tenon actuates along a second axis, the top cover and the modeling platform actuate along a first axis to open the tank, wherein the top cover has a cover body and a protrusion portion located on the cover body, and wherein the first tenon has a driving portion and at least one first locking portion extending from the driving portion, the driving portion is movably disposed in the protrusion portion, and a part of the driving portion protrudes out of the protrusion portion, a part of the first locking portion protrudes out of a side edge of the cover body and is correspondingly locked to a locking hole of the tank.

2. The three-dimensional printing module as claimed in claim 1, further comprising:

a sealing part, disposed on the tank and leaning between the cover body and the tank to seal the tank.

3. The three-dimensional printing module as claimed in claim 1, wherein the first axis is perpendicular to the second axis.

4. The three-dimensional printing module as claimed in claim 1, further comprising:

a separation film, disposed at a bottom of the tank.

5. The three-dimensional printing module as claimed in claim 1, further comprising:

a second tenon, movably assembled to the protrusion portion of the top cover.

6. The three-dimensional printing module as claimed in claim 5, wherein the second tenon comprises a pair of wedge-shaped locking members disposed along the second axis and an elastic member connected between the pair of wedge-shaped locking members, wherein the elastic member constantly drives the pair of wedge-shaped locking members to protrude out of a sidewall of the protrusion portion along the second axis.

7. A three-dimensional printing apparatus, comprising:
a base;
a driving mechanism, disposed on the base; and
a three-dimensional printing module detachably assembled to the base, a part of the driving mechanism being movably located above the three-dimensional printing module, and the three-dimensional printing module comprising:
a tank, configured to contain a liquid forming material;
a top cover, detachably assembled to the tank to open or close the tank; and
a first tenon, movably assembled to the top cover, wherein the first tenon is locked to the tank to close the top cover and fix the top cover to the tank; and
at least one consumable module, detachably assembled to the base, the part of the driving mechanism being movably located above the consumable module, wherein the at least one consumable module comprises another tank container, another liquid forming material, another top cover and another modeling platform, wherein when the to cover is locked to the tank through the first tenon, the tank, the top cover, the modeling platform and the liquid forming material in the tank are modularized to be replaced by the at least one consumable module from the three-dimensional printing apparatus,
wherein when the driving mechanism and the top cover are assembled to each other, the driving mechanism drives the first tenon to be unlocked from the tank, such that the top cover moves away from the tank along with the driving mechanism to open the tank.

8. The three-dimensional printing apparatus as claimed in claim 7, wherein the three-dimensional printing module further comprises:

a sealing part, disposed on the tank and leaning between the cover body and the tank to seal the opening of the tank.

9. The three-dimensional printing apparatus as claimed in claim 7, wherein the three-dimensional printing module further comprises:

a modeling platform, assembled to the cover body, located in the tank, and immersed in the liquid forming material, wherein when the top cover moves away from the tank along with the driving mechanism, the modeling platform moves away from the liquid forming material along with the cover body.

10. The three-dimensional printing apparatus as claimed in claim 9, wherein the liquid forming material is cured layer-by-layer to form a three-dimensional object on the modeling platform, and the three-dimensional object moves away from the tank along with the top cover and the modeling platform.

11. The three-dimensional printing apparatus as claimed in claim 9, wherein the three-dimensional printing module further comprises:

a separation film, disposed at a bottom of the tank, wherein when the top cover is not assembled to the driving mechanism, the separation film contacts between the modeling platform and the bottom of the tank.

12. The three-dimensional printing apparatus as claimed in claim 7, wherein the first tenon is flexible, and when the driving mechanism and the top cover are assembled to each other, the driving mechanism pushes the part of the driving portion protruding out of the protrusion portion into the protrusion portion, so as to drive the first locking portion to deform relative to the driving portion and release from the locking hole.

13. The three-dimensional printing apparatus as claimed in claim 7, wherein the first tenon has a pair of first locking portions extending away from each other from the driving portion.

14. The three-dimensional printing apparatus as claimed in claim 7, wherein the second tenon comprises a pair of wedge-shaped locking members disposed along the second axis and an elastic member connected between the pair of wedge-shaped locking members, wherein the elastic member constantly drives the pair of wedge-shaped locking members to protrude out of the sidewall of the protrusion portion along the second axis.

15. The three-dimensional printing apparatus as claimed in claim 9, wherein the top cover has a cover body and a protrusion portion located on the cover body, wherein the protrusion portion is configured to connect the driving mechanism, and the cover body is configured to close or open an opening of the tank.

16. The three-dimensional printing apparatus as claimed in claim 15, wherein the first tenon has a driving portion and at least one first locking portion extending from the driving portion, the driving portion is movably disposed in the protrusion portion, and a part of the driving portion protrudes out of the protrusion portion, a part of the first locking portion protrudes out of a side edge of the cover body and is correspondingly locked to a locking hole of the tank, wherein when the driving mechanism and the top cover are assembled to each other, the driving mechanism pushes the part of the driving portion protruding out of the protrusion portion into the protrusion portion, so as to drive the first locking portion to be released from the locking hole.

17. The three-dimensional printing apparatus as claimed in claim 16, wherein the driving mechanism pushes the driving portion into the protrusion portion along a first axis, and the driving portion drives the first locking portion to withdraw from the locking hole along a second axis, wherein the first axis is perpendicular to the second axis.

18. The three-dimensional printing apparatus as claimed in claim 17, wherein the driving mechanism comprises:
   a driving platform; and
   a connection arm, movably connected to the driving platform and located above the three-dimensional printing module, wherein the connection arm is assembled to the protrusion portion of the top cover along the first axis, and drives the top cover to move away from the tank.

19. The three-dimensional printing apparatus as claimed in claim 18, wherein the three-dimensional printing module further comprises:
   a second tenon, movably assembled to the protrusion portion of the top cover, and moving out or moving in a sidewall of the protrusion portion along the second axis, wherein the connection arm has a recess and a second locking portion located at a sidewall of the recess, when the connection arm is assembled to the top cover, the protrusion portion is accommodated in the recess, and the second tenon is locked to the second locking portion.

* * * * *